United States Patent
Sawada et al.

(10) Patent No.: US 6,810,274 B2
(45) Date of Patent: Oct. 26, 2004

(54) BATTERY PACK AND WIRELESS TELEPHONE APPARATUS

(75) Inventors: Takeshi Sawada, Tokyo (JP); Tohru Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 560 days.

(21) Appl. No.: 09/790,373

(22) Filed: Feb. 21, 2001

(65) Prior Publication Data

US 2001/0021663 A1 Sep. 13, 2001

(30) Foreign Application Priority Data

Feb. 24, 2000 (JP) .................................... P2000-052303

(51) Int. Cl.⁷ .............................................. H04M 1/00
(52) U.S. Cl. ................ 455/572; 455/556.1; 455/575.1; 455/90.3; 455/550.1
(58) Field of Search ............................. 455/556.1, 572, 455/575.1, 557, 127.1, 128, 90.3, 550.1; 379/441, 447

(56) References Cited

U.S. PATENT DOCUMENTS

| 5,534,366 A | * | 7/1996 | Hwang et al. | ................. | 429/91 |
| 5,619,117 A | | 4/1997 | Koenck | ........................ | 320/21 |
| 5,768,098 A | | 6/1998 | Murayama | .................. | 361/684 |
| 5,786,106 A | * | 7/1998 | Armani | ........................ | 429/98 |
| 5,864,766 A | * | 1/1999 | Chiang | ........................ | 455/572 |
| 5,883,493 A | | 3/1999 | Koenck | ........................ | 320/114 |
| 6,192,253 B1 | * | 2/2001 | Charlier et al. | .......... | 455/575.7 |
| 6,243,596 B1 | * | 6/2001 | Kikinis | ........................ | 455/572 |
| 6,244,894 B1 | * | 6/2001 | Miyashita | .................... | 439/500 |
| 6,526,287 B1 | * | 2/2003 | Lee | .......................... | 455/556.1 |
| 2001/0029192 A1 | * | 10/2001 | Oh | ............................ | 455/556 |
| 2002/0147035 A1 | * | 10/2002 | Su | .............................. | 455/572 |

FOREIGN PATENT DOCUMENTS

GB  2 292 287  * 2/1998 ............ H04Q/7/32

* cited by examiner

Primary Examiner—Sonny Trinh
(74) Attorney, Agent, or Firm—Jay H. Maioli (57) ABSTRACT

A portable telephone apparatus includes a portable telephone unit and a battery pack mounted thereto, wherein the battery pack includes a battery for supplying the portable telephone unit and components in the battery pack with electric power, an opening in which a semiconductor memory is removably inserted, and a memory controller for controlling the operation of reading data stored in the semiconductor memory inserted in the opening in accordance with a control signal from the portable telephone unit, and wherein the portable telephone unit includes a reproducer for reproducing the data read out from the semiconductor memory. When the battery park is removed abruptly before a power switch is turned off, data stored in the semiconductor memory is protected.

3 Claims, 7 Drawing Sheets

BATTERY PACK AND WIRELESS TELEPHONE APPARATUS

BACKGROUND OF THE INVENTION

1. Field of the Invention

The present invention relates to a battery pack for supplying an electronic apparatus with electric power, and a wireless telephone set which is supplied with electric power by the battery pack mounted thereto.

2. Description of Related Art

Portable electronic apparatuses, such as a wireless telephone set, a personal digital assistance (PDA) and a digital still camera, have a battery pack mounted thereto, and those portable electronic apparatuses are supplied with electric power by the battery pack. Recently, such portable electronic apparatuses have a removable IC card or memory card having at least semiconductor memories to store character data, image data and audio data.

When the battery packs are removed abruptly from the portable electronic apparatuses with their IC cards contained therein before power switches are turned off, data stored in the semiconductor memories of the IC cards are sometimes broken or lost.

SUMMARY OF THE INVENTION

It is therefore an object of the present invention to overcome the above-mentioned drawbacks by providing a battery pack for supplying an electronic apparatus with electric power which can protect data stored in the semiconductor memories of the IC card, and a wireless telephone set which is supplied with electric power by the battery pack.

According to the present invention, there is provided a portable telephone apparatus including a portable telephone unit and a battery pack mounted thereto,
wherein the battery pack including:
  a battery for supplying the portable telephone unit and components in the battery pack with electric power;
  an opening from which a semiconductor memory is removably inserted; and
  a memory controller for controlling the operation of reading data stored in the semiconductor memory inserted from the opening in accordance with a control signal from the portable telephone unit,
and wherein the portable telephone unit including:
  means for reproducing the data read out from the semiconductor memory.

According to the present invention, there is provided a battery pack for supplying a portable telephone unit of a portable telephone apparatus with electric power, which is mounted to the portable telephone unit, the battery pack including:
  a battery for supplying the portable telephone unit and components in the battery pack with electric power;
  an opening from which a semiconductor memory is removably inserted;
  a memory controller for controlling the operation of reading audio data stored in the semiconductor memory inserted from the opening in accordance with a control signal from the portable telephone unit; and
  means for reproducing the audio data read out from the semiconductor memory.

According to the present invention, since the battery pack has the semiconductor memory, the battery pack and the wireless telephone set can protect data stored in the semiconductor memory.

Still more, since the battery pack includes a music playback device, the portable telephone unit becomes independent of the compression standards, such as the MPEG 3, ATRAC, etc., which makes the portable telephone unit compatible with various standards.

Furthermore, since the battery pack includes the music playback device, codes peculiar to the wireless telephone set used for managing copyrights and securities can be separated easily. Thus, the codes do not have to be copied, and the codes are not undesirably read out to outside.

Furthermore, since the battery pack includes the music playback device, the wireless telephone set itself can be reduced in size.

These objects and other objects, features and advantages of the present intention will become more apparent from the following detailed description of the preferred embodiments of the present invention when taken in conjunction with the accompanying drawings.

DESCRIPTION OF THE PREFERRED EMBODIMENTS

Preferred embodiments according to the present invention will further be described below with reference to the accompanying drawings.

Figure 1:
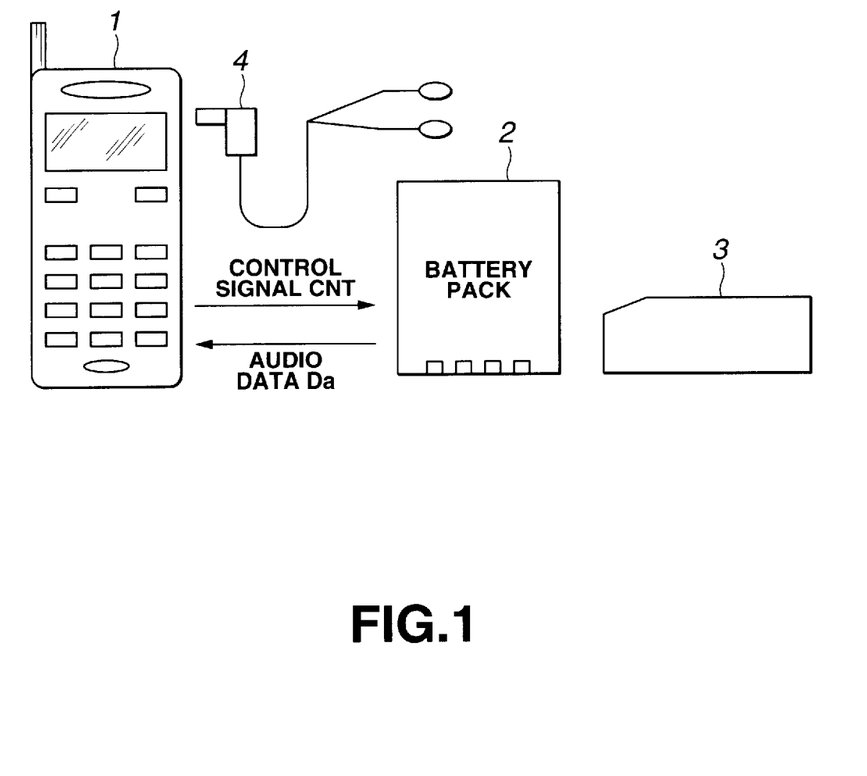
FIG. 1 shows a schematic view of a first embodiment of the wireless telephone set according to the present invention.

FIGS. 1 to 4 show a first embodiment of the wireless telephone set according to the present invention. As schematically shown in FIG. 1, the wireless telephone set includes a portable telephone unit 1 and a battery pack 2. The battery pack 2 supplies the portable telephone unit 1 with electric power, and has a removable IC card having semiconductor memories 3 contained therein. The removable IC card having semiconductor memories 3 will be refereed to the semiconductor memory 3 hereinafter.

The portable telephone unit 1 includes a music playback device to reproduce an audio signal which has a memory, an amplifier and a DSP. Having the semiconductor memory 3 contained therein, the battery pack 2 provides the music playback device with audio data Da stored in the semiconductor memory 3 in accordance with a control signal CNT from the portable telephone unit 1.

The portable telephone unit 1 further includes a connector to receive data from the semiconductor memory 3, a jack for a head receiver 4 adapted for listening to music reproduced by the music playback device, and an input operation unit such as keys or a numeric keypad.

When the control signal CNT generated based on a reproduction operation of the input operation unit of the portable telephone unit 1 is sent to the battery pack 2 via the connector, the audio data Da stored in the semiconductor memory 3 is read out and sent to the music playback device. The audio data Da is stored in the memory of the music playback device, and is reproduced from the memory.

Figure 2:
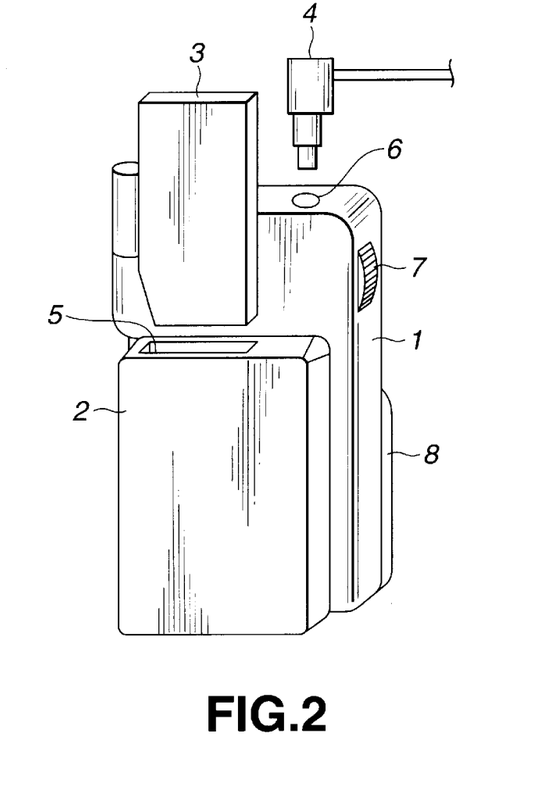
FIG. 2 shows a schematic view of a portable telephone unit and a battery pack mounted thereto of the first embodiment of the wireless telephone set.

FIG. 2 shows the wireless telephone set with its battery pack 2 mounted to the portable telephone unit 1. The semiconductor memory 3 will be inserted to the battery pack 2 from an opening 5. The portable telephone unit 1 further includes a jack 6 for the head receiver 4 and a jog dial 7 to register telephone numbers and retrieve a telephone number from registered telephone numbers. The portable telephone unit 1 further includes a cover 8, and the portable telephone unit 1 is of the folding structure. The cover 8 in the folded state is unfolded when using the portable telephone unit 1.

Figure 3:
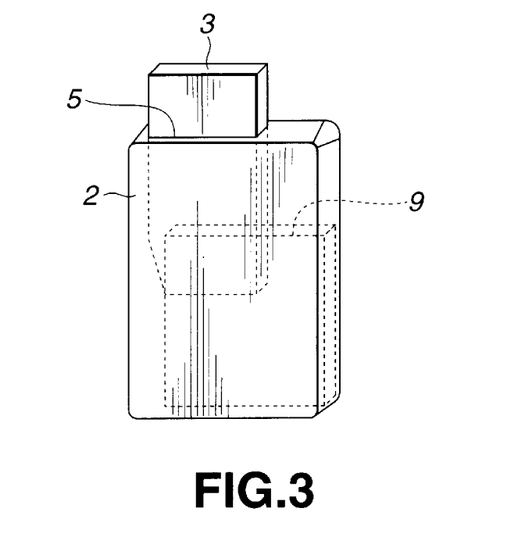
FIG. 3 shows a schematic view of the battery pack and a semiconductor memory contained therein of the first embodiment of the wireless telephone set.

FIG. 3 shows the battery pack 2 with the semiconductor memory 3 contained therein. The battery pack 2 has a secondary battery 9 contained therein.

Figure 4:
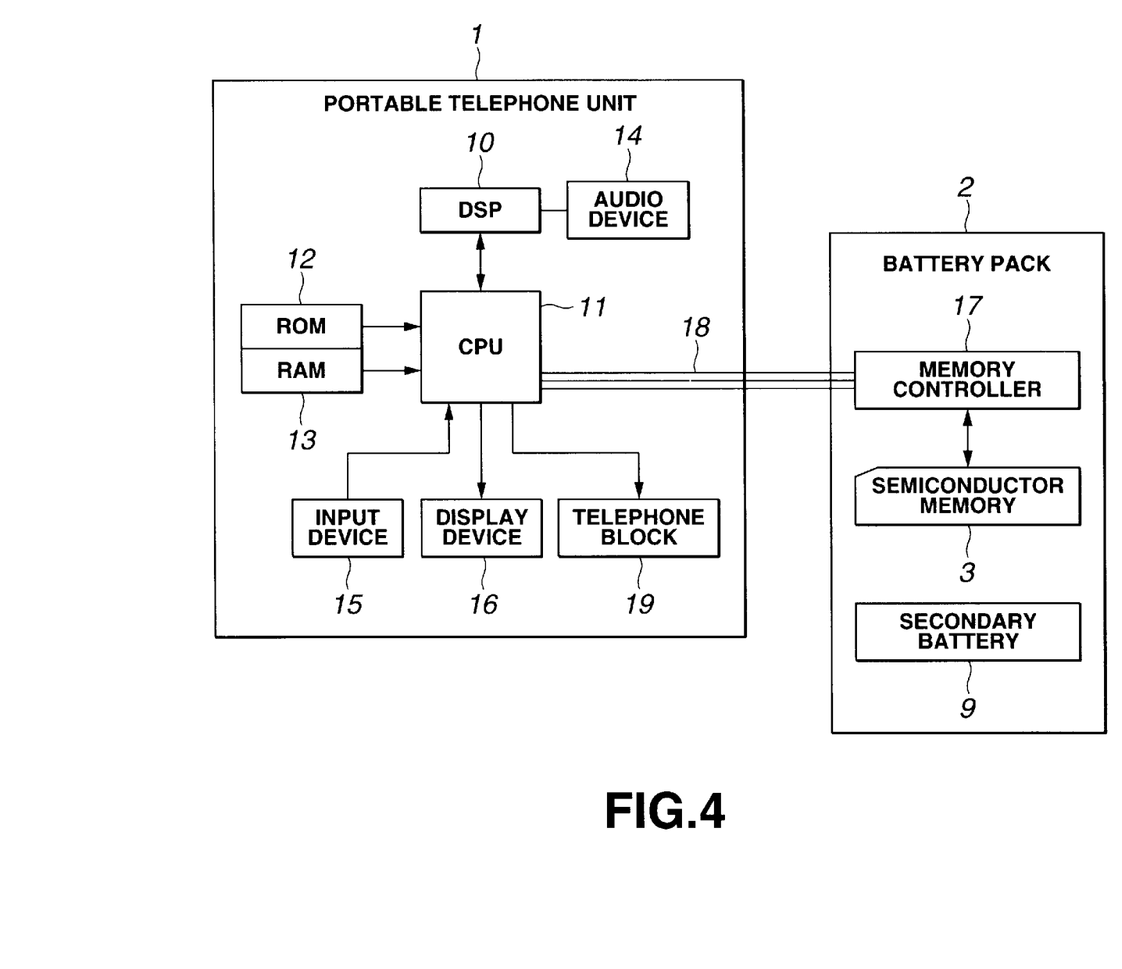
FIG. 4 shows a block diagram of the portable telephone unit and battery pack mounted thereto of the first embodiment of the wireless telephone set.

FIG. 4 shows a block diagram of the wireless telephone set with its battery pack 2 mounted to the portable telephone unit 1. The portable telephone unit 1 includes a CPU 11, a digital signal processor (DSP) 10 to reproduce an audio signal, an audio device 14, a ROM 12, a RAM 13, an input device 15, a display device 16 and a telephone block 19. The DSP 10 is connected to the CPU 11. The audio device 14 has an amplifier, speaker, head receiver jack, etc., and is connected to the DSP 10. The ROM 12, RAM 13, input device 15, display device 16 and telephone block 19 are connected to the CPU 11. On the other hand, the battery pack 2 includes a memory controller 17 to control the operation of reading/writing data from/to the semiconductor memory 3.

The CPU 11 of the portable telephone unit 1 performs a series of control programs stored in the ROM 12 in accordance with key operation by the user using the input device 15 to generate the control signal CNT, and sends the control signal CNT to the memory controller 17 of the battery pack 2 via a connector 18. The memory controller 17 of the battery pack 2 reads the audio data Da from the semiconductor memory 3 in accordance with the control signal CNT, and sends the audio data Da to the CPU 11 via the connector 18. The CPU 11 stores the audio data Da in the RAM 13, and the DSP 10 processes the audio data Da and outputs an audio signal to the audio device 14, and the audio device 14 amplifies the audio signal and outputs an audio sound. The display device 16 displays information according to key operation using the input device 15, and also displays music titles, the time, etc.

The telephone block 19 has a reception system and a transmission system. First, the reception system will be explained. An RF signal is received by an antenna, and the received RF signal is sent to a reception unit. At the reception unit, the RF signal is down-converted, filtered and demodulated by a local oscillating signal from a local oscillator to generate a baseband signal. The reproduced baseband signal from the reception unit is sent to a speech processing unit, and a processed signal is sent to a speaker. Next, the transmission system will be explained. A speech signal from a microphone is sent to a transmission unit via the speech processing unit. At the transmission unit, the speech signal is modulated and up-converted to generate a transmitting RF signal. The transmitting RF signal is sent to the antenna and transmitted. The speech processing unit and speaker can be shared with those of the audio device 14.

The portable telephone unit 1 is supplied with electric power by the secondary battery 9 of the battery pack 2 having the semiconductor memory 3 contained therein. Accordingly, even though the battery pack 2 is removed from the portable telephone unit 1, the semiconductor memory 3 is kept supplied with electric power by the secondary battery 9. Thus, the data recorded in the semiconductor memory 3 is not broken or lost. Furthermore, even though a semiconductor memory of another shape or of another standard is used, or even though the shape or standard of the semiconductor memory 3 is modified, the wireless telephone set can be used by replacing the battery pack 2 to another one capable of containing a desired semiconductor memory, which does not have to change the portable telephone unit 1.

Figure 5:
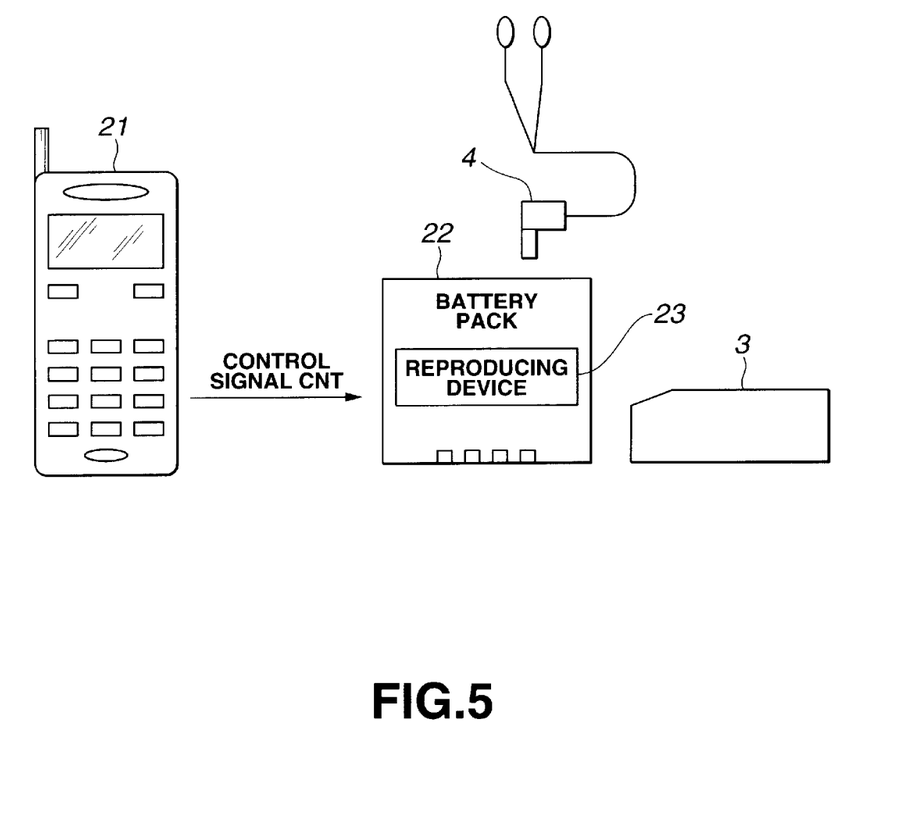
FIG. 5 shows a schematic view of a second embodiment of the wireless telephone set according to the present invention.

FIGS. 5 to 8 show a second embodiment of the wireless telephone set according to the present invention. As schematically shown in FIG. 5, the wireless telephone set includes a portable telephone unit 21 and a battery pack 22. The battery pack 22 supplies the portable telephone unit 21 with electric power, and has the removable semiconductor memory 3 contained therein.

The portable telephone unit 21, being different from the portable telephone unit 1, does not include the music playback device to reproduce an audio signal, such as the memory, amplifier or DSP. Instead, the battery pack 22 includes a reproducing device 23 which works as the music playback device. The battery pack 22 further includes a jack for the head receiver 4.

Figure 6:
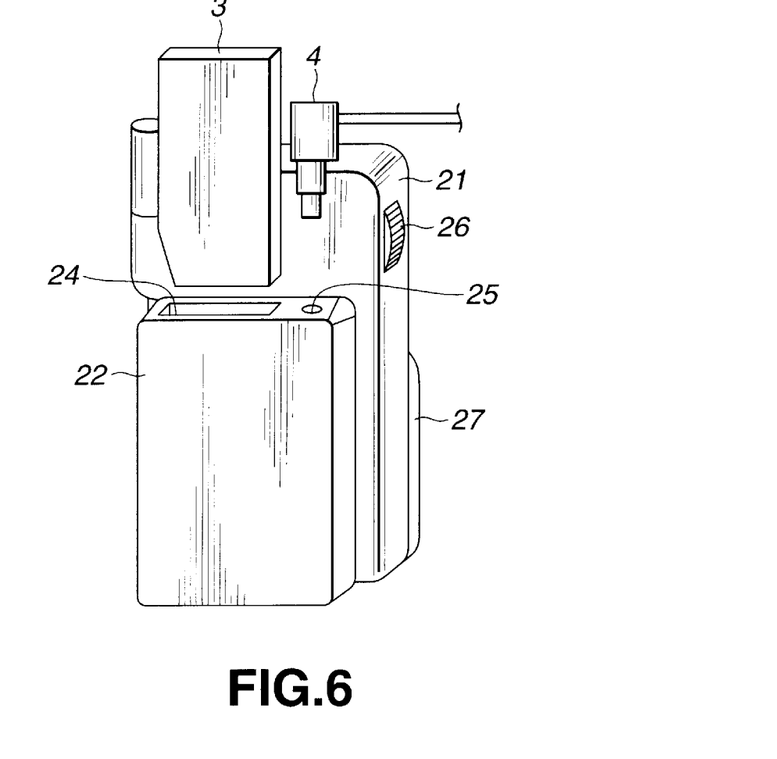
FIG. 6 shows a schematic view of a portable telephone unit and a battery pack mounted thereto of the second embodiment of the wireless telephone set.

FIG. 6 shows the wireless telephone set with its battery pack 22 mounted to the portable telephone unit 21. The semiconductor memory 3 also will be inserted to the battery pack 22 from an opening 24. The battery pack 22 includes a jack 25 for the head receiver 4. The portable telephone unit 21 includes a jog dial 26 to register telephone numbers and retrieve a telephone number from registered telephone numbers. The portable telephone unit 21 further includes a cover 27, and an input operation unit such as keys or a numeric keypad is protected by the cover 27.

Figure 7:
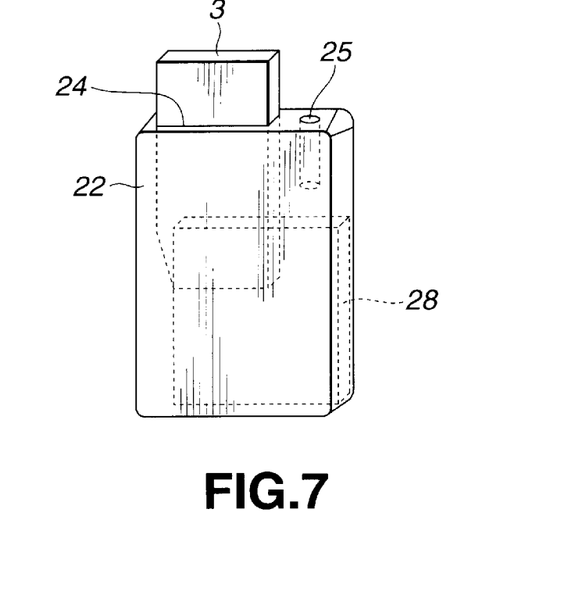
FIG. 7 shows a schematic view of the battery pack and a semiconductor memory contained therein of the second embodiment of the wireless telephone set.

FIG. 7 shows the battery pack 22 with the semiconductor memory 3 contained therein. The battery pack 22 has a secondary battery 28 contained therein.

Figure 8:
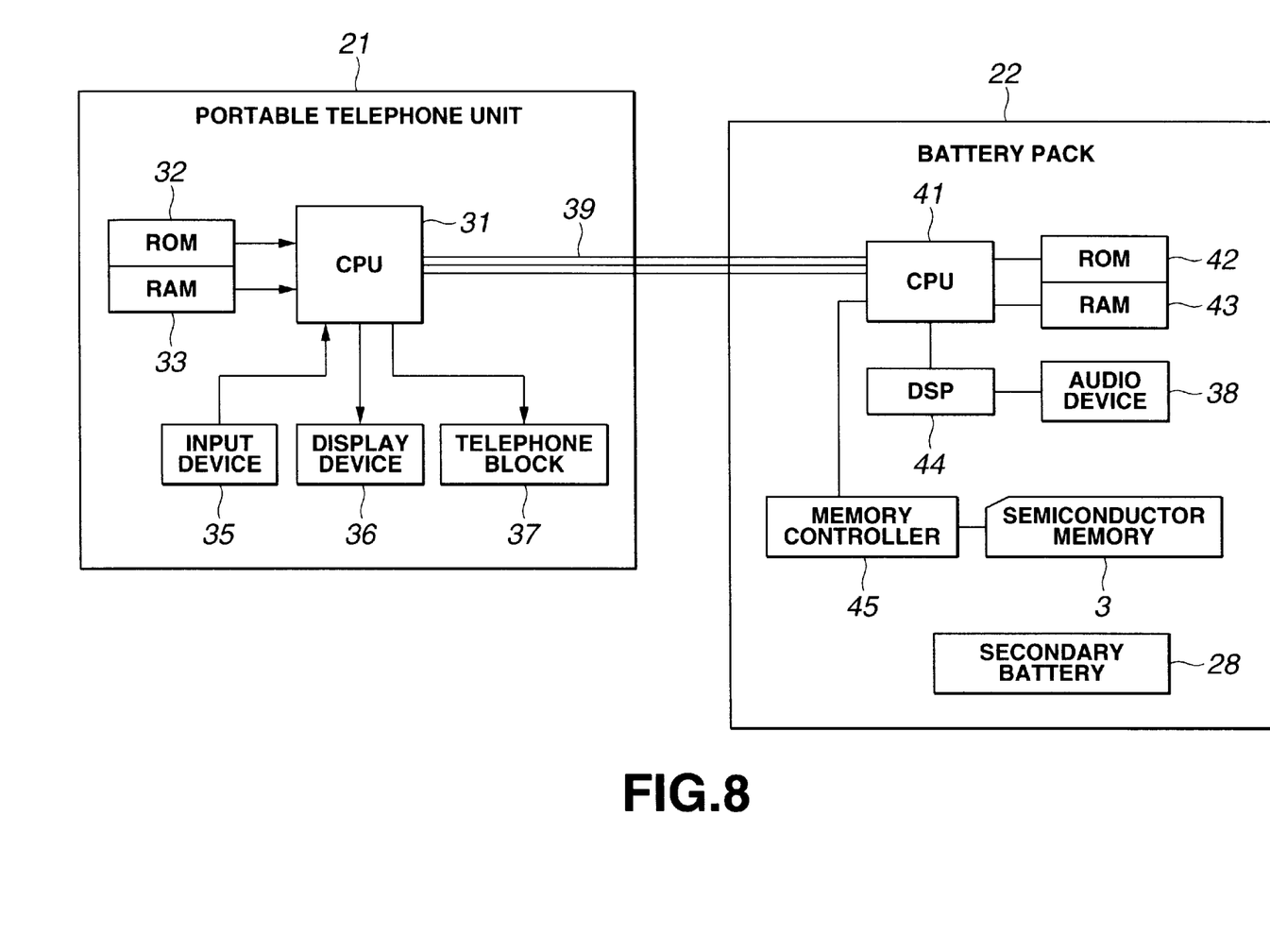
FIG. 8 shows a block diagram of the portable telephone unit and battery pack mounted thereto of the second embodiment of the wireless telephone set.

FIG. 8 shows a block diagram of the wireless telephone set with its battery pack 22 mounted to the portable telephone unit 21. The portable telephone unit 21 includes a CPU 31, a ROM 32, a RAM 33, an input device 35, a display device 36 and a telephone block 37. The ROM 32, RAM 33, input device 35, display device 36 and telephone block 37 are connected to the CPU 31. On the other hand, the battery pack 22 includes an audio device 38, a memory controller 45 to control the operation of reading/writing data from/to the semiconductor memory 3, a CPU 41, a ROM 42, a RAM 43 and a digital signal processor (DSP) 44 to reproduce an audio signal. The audio device 38 has an amplifier, speaker, head receiver jack, etc., and is connected to the DSP 44. The memory controller 45, ROM 42, RAM 43 and DSP 44 are connected to the CPU 41.

The CPU 31 of the portable telephone unit 21 performs a series of control programs stored in the ROM 32 in accordance with key operation by the user using the input device 35 to generate the control signal CNT, and sends the control signal CNT to the CPU 41 of the battery pack 22 via a connector 39. The CPU 41 sends the control signal CNT to the memory controller 45. The memory controller 45 of the battery pack 22 reads the audio data Da from the semiconductor memory 3 in accordance with the control signal CNT, and sends the audio data Da to the CPU 41. The CPU 41 stores the audio data Da in the RAM 43, and the DSP 44 processes the audio data Da and outputs an audio signal to the audio device 38, and the audio device 38 amplifies the audio signal and outputs an audio sound. The display device 36 of the portable telephone unit 21 displays information according to key operation using the input device 35, and also displays music titles, the time, etc. The telephone block 37 of the portable telephone unit 21 has a reception system, transmission system, controller, antenna, etc.

The portable telephone unit 21 is supplied with electric power by the secondary battery 28 of the battery pack 22 having the semiconductor memory 3 contained therein. Accordingly, even though the battery pack 22 is removed from the portable telephone unit 21, the semiconductor memory 3 is kept supplied with electric power by the secondary battery 28. Thus, the data recorded in the semiconductor memory 3 is not broken or lost.

Still more, since the battery pack 22 includes the reproducing device 23, the portable telephone unit 21 becomes independent of the compression standards, such as the MPEG 3, ATRAC, etc., which makes the portable telephone unit 21 compatible with various standards.

Conventionally, music playback device manages copyrights and securities by the use of plural codes stored in a music playback block. So, when the wireless telephone set is out of order, or the wireless telephone set itself is changed, the codes peculiar to the wireless telephone set have to be copied. At this time, there occurs a possibility that the codes are undesirably read out to outside. Thus, the management system for preventing the copying has to be built. On the other hand, since the portable telephone unit 21 can be separated from the battery pack 22 including the music playback block, the copy-preventing management system does not have to be built.

Furthermore, conventionally, in case the battery pack is shared with a model which does not reproduce an audio signal, the wireless telephone set can hardly be reduced in size since the space for the music playback block is an extra space. On the other hand, since the battery pack 22 includes the music playback block, the wireless telephone set can be reduced in size.

When a delivery notice information is included in the control signal CNT generated by the CPU 31, the user can know the delivery notice while listening to music.

Figure 9:
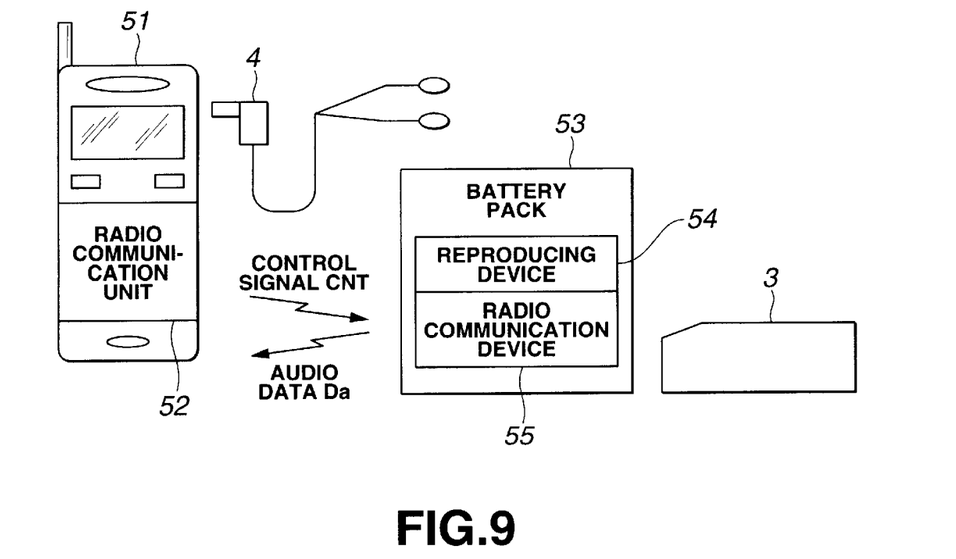
FIG. 9 shows a schematic view of a third embodiment of the wireless telephone set according to the present invention.

FIG. 9 shows a third embodiment of the wireless telephone set according to the present invention. As schematically shown in FIG. 9, the wireless telephone set includes a portable telephone unit 51 and a battery pack 53. The battery pack 53 supplies the portable telephone unit 51 with electric power, and has the removable semiconductor memory 3 contained therein.

The portable telephone unit 51 includes a radio communication unit 52, and the battery pack 53 includes a radio communication device 55. So, the portable telephone unit 51 can transmit a radio signal of the control signal CNT, and the battery pack 53 can receive the radio signal. The battery pack 53 further includes a reproducing device 54. So, the battery pack 53 can transmit a radio signal of the audio data Da reproduced from the semiconductor memory 3 to the portable telephone unit 51.

In case the radio communication unit 52 of the portable telephone unit 51 can receive only a weak radio signal transmitted from adjacent apparatuses, the portable telephone unit 51 can be accessible to plural battery packs. So, the portable telephone unit 51 can freely choose and reproduce an audio signal without changing the semiconductor memory 3 of the battery pack 53 by the key operation of the portable telephone unit 51 when the user carries plural battery packs including plural music playback blocks.

Figure 10:
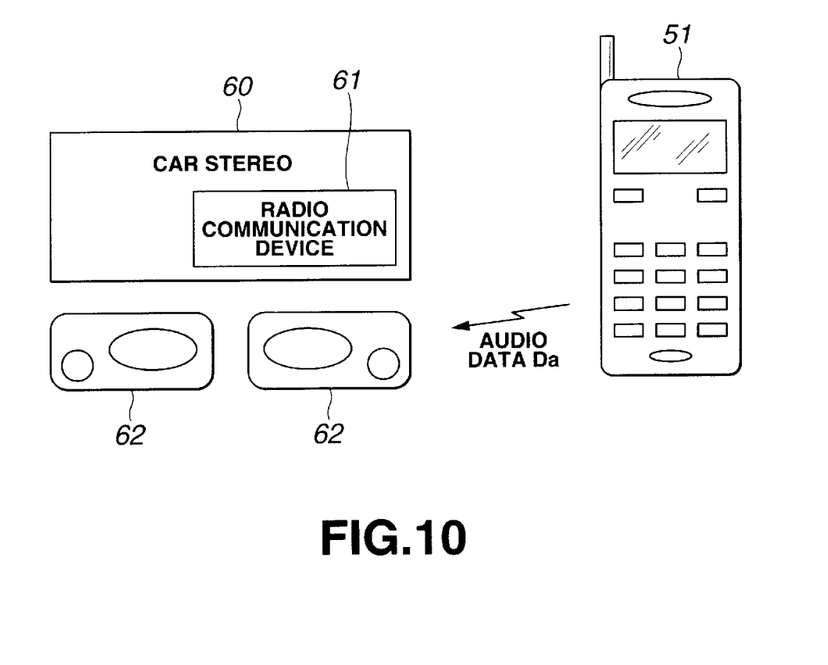
FIG. 10 shows a schematic view of the wireless telephone set and a car stereo which receives a radio signal of music therefrom.

Still more, having a battery contained therein, the portable telephone unit 51 can transmit a reproduction request signal to a nearby reproducing apparatus capable of transmitting/receiving a radio signal which is other than the portable telephone unit 51. FIG. 10 shows a car stereo 60 or a navigator having a radio communication device 61 mounted thereto, and loud speakers 62. The radio signal of music to which the user is listening by means of the portable telephone unit 51 is transmitted to the car stereo 60, and the music is output from the loud speakers 62.

What is claimed is:

1. A portable telephone apparatus comprising:

a portable telephone unit including a telephone controller; and a battery pack mounted thereto, wherein the battery pack includes:

a removable semiconductor memory having audio data recorded therein;

a battery for supplying the portable telephone unit and components in the battery pack with electric power;

a housing having an opening therein in which the semiconductor memory is removably inserted; and a memory controller for controlling an operation of reading the audio data stored in the semiconductor memory inserted in the opening of the housing in accordance with a control signal from the telephone controller of the portable telephone unit, and wherein the portable telephone unit further includes reproducing means for reproducing the audio data read out from the semiconductor memory and producing an audio sound output.

2. A battery pack for supplying a portable telephone unit of a portable telephone apparatus including a telephone controller with electric power when the battery pack is mounted to the portable telephone unit, the battery pack comprising:

a removable semiconductor memory having audio data recorded therein;

a battery for supplying the portable telephone unit and components in the battery pack with electric power;

a housing having an opening therein in which the semiconductor memory is removably inserted;

a memory controller for controlling an operation of reading the audio data stored in the semiconductor memory inserted in the opening of the housing in accordance with a control signal from the telephone controller of the portable telephone unit; and reproducing means for reproducing the audio data read out from the semiconductor memory.

3. The battery pack as set forth in claim 2, wherein the battery pack further comprises an earphone jack for outputting the audio data reproduced by the reproducing means.

* * * * *